(12) United States Patent
Inoue et al.

(10) Patent No.: US 10,295,143 B2
(45) Date of Patent: May 21, 2019

(54) LIGHT UNIT AND VEHICLE

(71) Applicant: HONDA MOTOR CO., LTD., Tokyo (JP)

(72) Inventors: Naoto Inoue, Wako (JP); Ryuya Kawaji, Wako (JP); Go Shimizu, Wako (JP); Shunichi Nakano, Wako (JP)

(73) Assignee: HONDA MOTOR CO., LTD, Tokyo (JP)

( * ) Notice: Subject to any disclaimer, the term of this patent is extended or adjusted under 35 U.S.C. 154(b) by 0 days.

(21) Appl. No.: 15/964,659

(22) Filed: Apr. 27, 2018

(65) Prior Publication Data

US 2018/0347779 A1 Dec. 6, 2018

(30) Foreign Application Priority Data

May 30, 2017 (JP) ................................. 2017-106806

(51) Int. Cl.
*F21V 21/00* (2006.01)
*F21S 45/33* (2018.01)
*B60Q 1/04* (2006.01)

(52) U.S. Cl.
CPC ............ *F21S 45/33* (2018.01); *B60Q 1/0408* (2013.01)

(58) Field of Classification Search
CPC .......... F21S 45/33; F21S 45/37; B60Q 1/0408
USPC ................................................. 362/547, 373
See application file for complete search history.

(56) References Cited

U.S. PATENT DOCUMENTS

| | | | | |
|---|---|---|---|---|
| 6,497,507 | B1 * | 12/2002 | Weber | F21S 45/43 362/547 |
| 9,618,177 | B2 | 4/2017 | Ito et al. | |
| 2002/0044455 | A1 * | 4/2002 | Ozawa | B60Q 1/0408 362/547 |
| 2009/0196063 | A1 * | 8/2009 | Kracker | B60Q 1/0017 362/547 |
| 2016/0084471 | A1 * | 3/2016 | Sander | F21S 45/43 362/547 |
| 2016/0109087 | A1 * | 4/2016 | Ito | F21S 45/33 362/547 |

(Continued)

FOREIGN PATENT DOCUMENTS

| | | |
|---|---|---|
| JP | 2002-068016 A | 3/2002 |
| JP | 2016-081892 A | 5/2016 |

OTHER PUBLICATIONS

Japanese Office Action (w/ partial English translation) issued for Application No. 2017-106806 dated Sep. 28, 2018.

*Primary Examiner* — Laura K Tso
(74) *Attorney, Agent, or Firm* — Thomas | Horstemeyer, LLP

(57) ABSTRACT

The preset invention provides a light unit attached to a vehicle, the unit including a ventilation mechanism configured to ventilate a space between an outer lens and a housing, wherein the ventilation mechanism includes a first passage including, at one end, a first opening connected to a communicating hole and communicating with the space, a second passage including, at one end, a second opening that opens to a front side of the vehicle, a third passage including, at one end, a third opening that opens to a rear side of the vehicle, and a connecting passage to which the other end of the first passage, the other end of the second passage, and the other end of the third passage are connected.

5 Claims, 8 Drawing Sheets

(56) References Cited

U.S. PATENT DOCUMENTS

2016/0377255 A1\* 12/2016 Schubert ................ F21S 45/37
362/547

\* cited by examiner

LIGHT UNIT AND VEHICLE

BACKGROUND OF THE INVENTION

Field of the Invention

The present invention relates to a light unit and a vehicle.

Description of the Related Art

In a vehicle represented by a four-wheeled vehicle, generally, headlights or headlamps configured to illuminate the front side of the vehicle are provided on the left and right sides of the front surface of the vehicle. The headlight does not have a sealed structure, and water in air exists inside the headlight. This may cause condensation (fogging) inside the headlight. Japanese Patent Laid-Open No. 2002-68016 proposes a technique of providing a duct between a headlight and a radiator fan and doing ventilation inside a headlight using the radiator fan.

In the technique disclosed in Japanese Patent Laid-Open No. 2002-68016, however, since the duct needs to be extended from the headlight to the radiator fan, the structure configured to do ventilation inside the headlight tends to be bulky. Additionally, in the technique disclosed in Japanese Patent Laid-Open No. 2002-68016, ventilation inside the headlight cannot be done in a state in which the radiator fan is not rotating.

SUMMARY OF THE INVENTION

The present invention efficiently performs ventilation between an outer lens and a housing.

According to the present invention, there is provided a light unit attached to a vehicle, the unit including an outer lens configured to form a part of an outer surface of the vehicle, a housing connected to the outer lens and provided with a light source configured to illuminate an outside of the vehicle, a communicating hole provided in the housing and configured to make a space between the outer lens and the housing communicate with an outside of the space, and a ventilation mechanism configured to ventilate the space, wherein the ventilation mechanism includes a first passage including, at one end, a first opening connected to the communicating hole and communicating with the space, a second passage including, at one end, a second opening that opens to a front side of the vehicle, a third passage including, at one end, a third opening that opens to a rear side of the vehicle, and a connecting passage to which the other end of the first passage, the other end of the second passage, and the other end of the third passage are connected.

Further objects or other aspects of the present invention will become apparent from the following detailed description of the embodiments with reference to the accompanying drawings.

DESCRIPTION OF THE EMBODIMENTS

Figure 1:
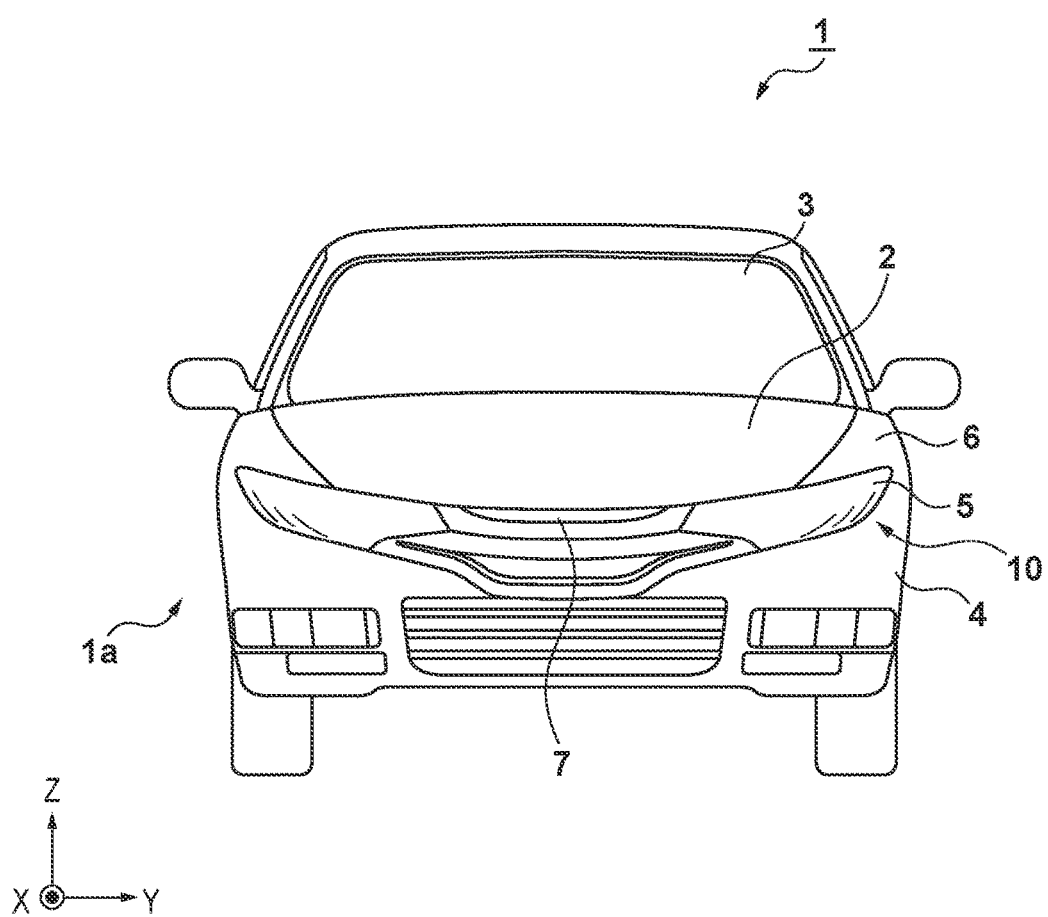
FIG. 1 is a schematic view showing the arrangement of a vehicle according to an aspect of the present invention.

A preferred embodiment of the present invention will now be described with reference to the accompanying drawings. Note that the same reference numerals denote the same members throughout the drawings, and a repetitive description will be omitted.

FIG. 1 is a schematic view showing the arrangement of a vehicle 1 according to an aspect of the present invention. FIG. 1 shows the front (front surface 1a) of the vehicle 1. The vehicle 1 is, for example, a four-door sedan type four-wheeled vehicle. However, the present invention is also applicable to a four-wheeled vehicle other than the sedan type or a vehicle of another type. Note that in the drawings including FIG. 1, a coordinate axis X represents the longitudinal direction of the vehicle, a coordinate axis Y represents the vehicle width direction of the vehicle 1, and a coordinate axis Z represents the vertical direction of the vehicle 1.

The vehicle 1 is roughly divided into a front portion, a middle portion, and a rear portion. For example, driving units such as an engine and a transmission are stored in the front portion of the vehicle 1. The front portion of the vehicle 1 includes a front hood 2 as an exterior (outer surface) that covers the internal storage space. A cowl between the front hood 2 and a windshield 3 is provided with the bases of wipers and the inlet of a ventilator. On the front surface 1a of the vehicle 1, a front bumper 4 serving as a buffer portion that reduces and absorbs the impact of a collision is provided on the lower side of the front hood 2. Additionally, headlight units 10 each including a headlight 5 that illuminates the front side of the vehicle 1 are attached to the front surface 1a of the vehicle 1. The middle portion of the vehicle 1 forms, for example, a cabin. The rear portion of the vehicle 1 forms, for example, a trunk.

The headlight units 10 are attached to two, left and right portions of the front surface 1a of the vehicle 1. For example, the headlight units 10 are arranged on the lower side of the front hood 2 and a fender 6 and on the upper side of the front bumper 4 (that is, between the front hood 2, the fender 6, and the front bumper 4) to be adjacent to a front grille 7.

Figure 2:
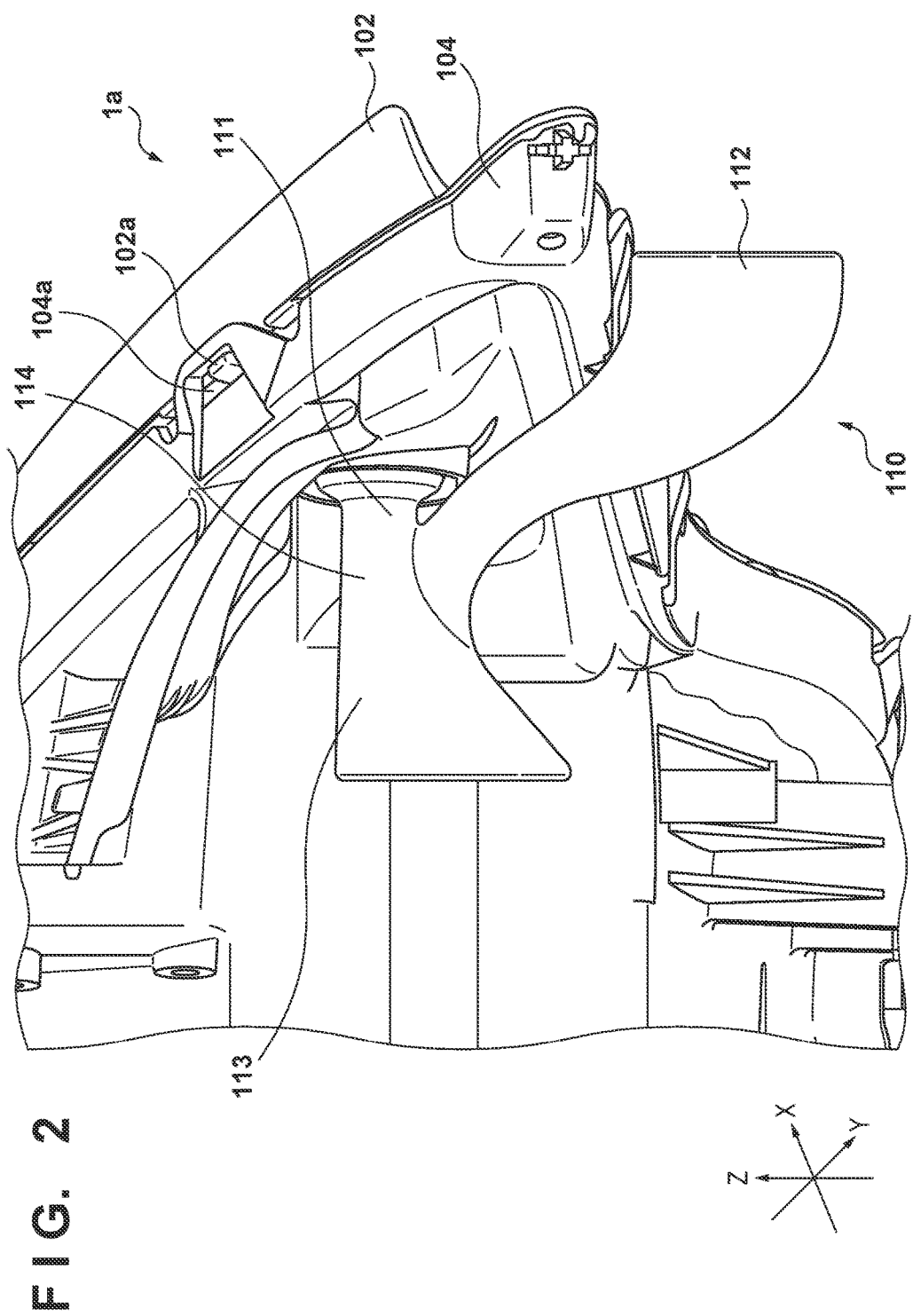
FIG. 2 is a perspective view of a headlight unit of the vehicle shown in FIG. 1 viewed from the rear side of the vehicle.
Figure 3:
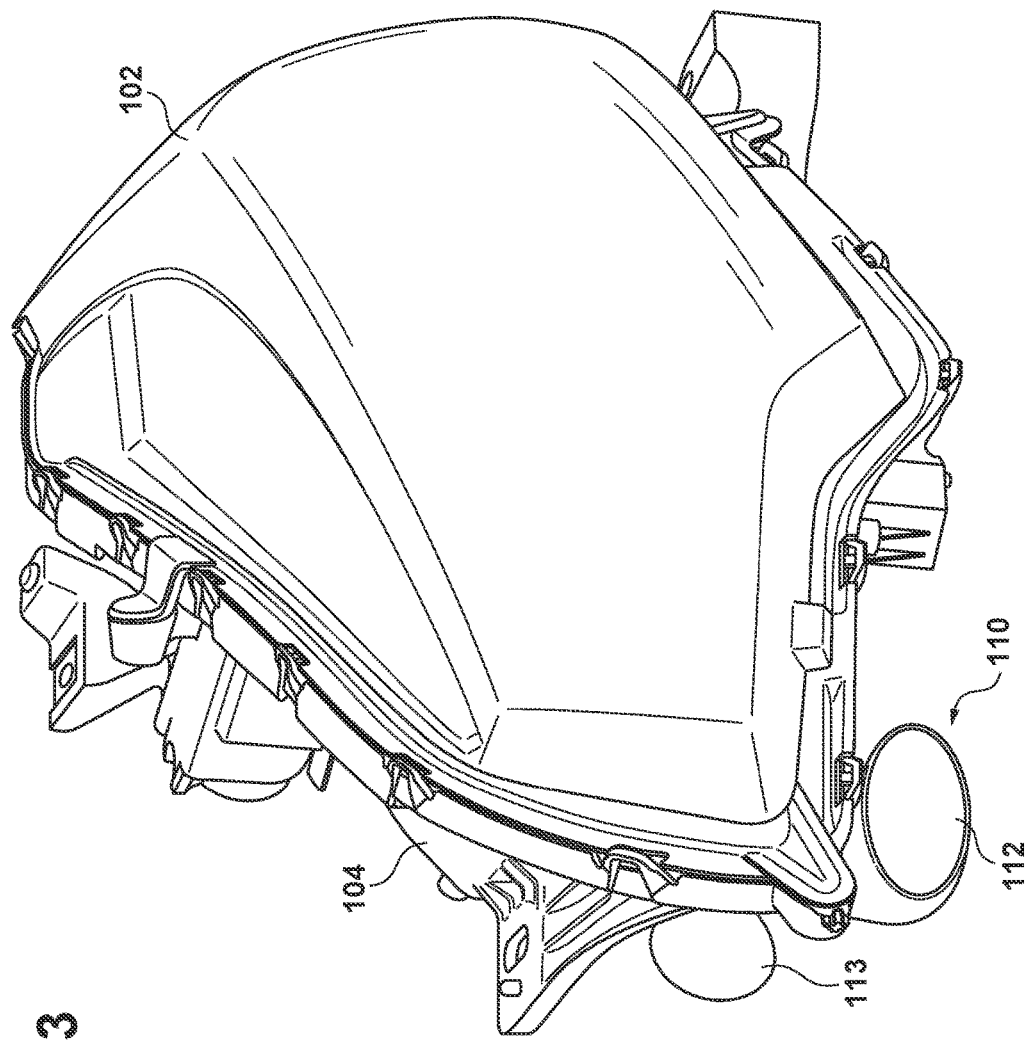
FIG. 3 is a perspective view of the headlight unit of the vehicle shown in FIG. 1 viewed from the front side of the vehicle.

As shown in FIGS. 2 and 3, each headlight unit 10 includes an outer lens 102, a housing 104, and a ventilation mechanism 110. FIG. 2 is a perspective view of the headlight unit 10 viewed from the rear side of the vehicle 1, and FIG. 3 is a perspective view of the headlight unit 10 viewed from the front side of the vehicle 1.

The outer lens 102 is a cover member that covers a light source configured to illuminate the front side (outer side) of the vehicle 1, and the like, and forms a part of the outer surface of the vehicle 1. The outer lens 102 is made of a translucent material with an excellent durability to an external impact and weather. Additionally, in this embodiment, a pawl portion 102a used to connect the outer lens 102 and the housing 104 is formed on (the outer edge of) the outer lens 102.

A hole portion 104a is formed in the housing 104 in correspondence with the pawl portion 102a of the outer lens 102. In this embodiment, the pawl portion 102a of the outer lens 102 is fitted in the hole portion 104a of the housing 104, thereby connecting the outer lens 102 and the housing 104. However, the outer lens 102 and the housing 104 may be connected using a fastening member such as a clip or a screw or may be connected using an adhesive.

Figure 4:
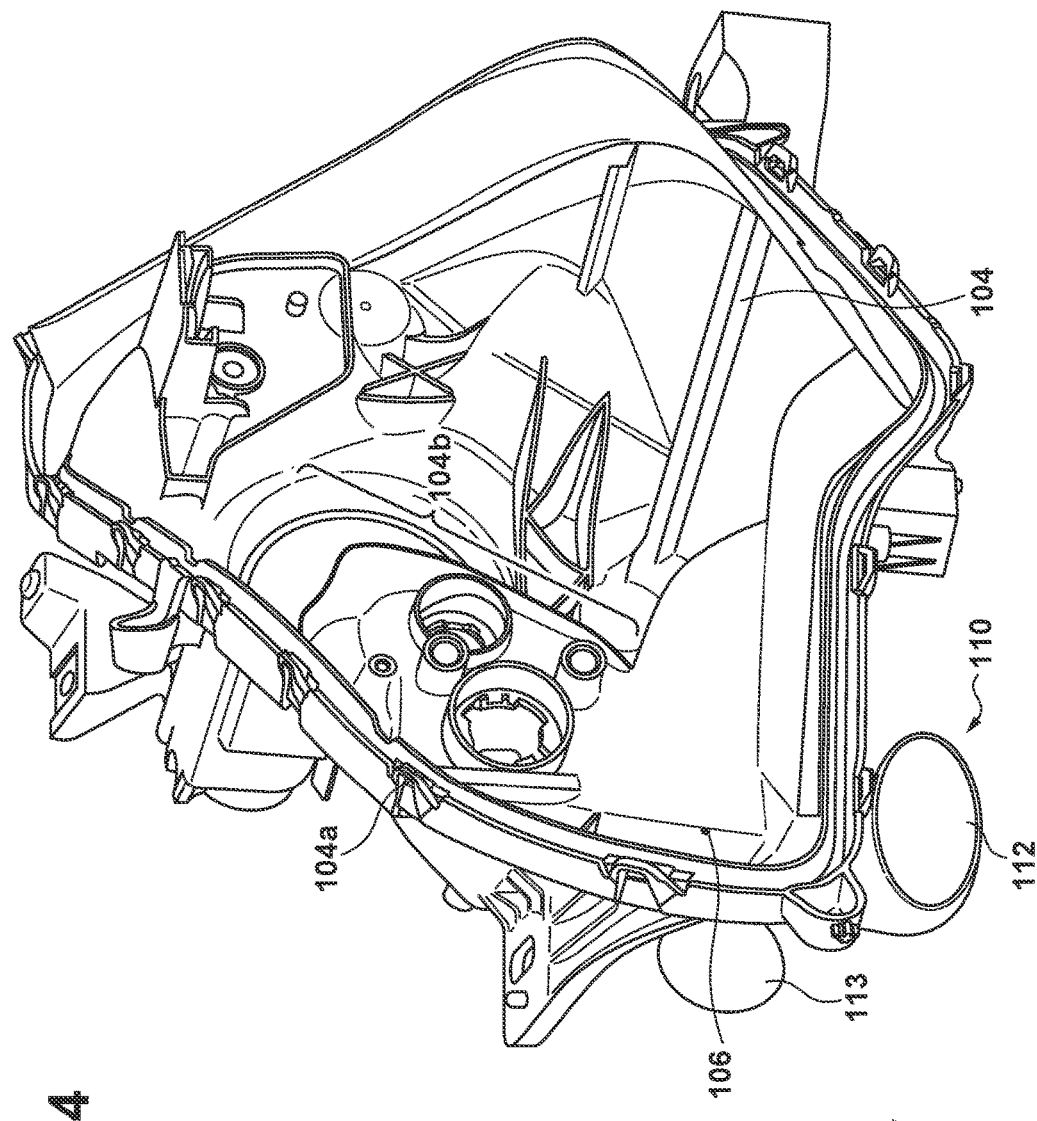
FIG. 4 is a view showing a state in which an outer lens is detached from the headlight unit shown in FIG. 3.

As shown in FIG. 4, the housing 104 includes, on the inner surface (the surface on the outer lens side), an attachment portion 104b to which a light source that illuminates the front side of the vehicle 1, a light source that constitutes a side marker lamp (positioning lamp), and the like are attached. The light source that illuminates the front side of the vehicle 1 includes, for example, a halogen bulb, a xenon bulb, an LED (Light Emitting Diode) lamp, and the like. Additionally, in the housing 104, a communicating hole 106 that makes a space SP (FIG. 5) defined between the outer lens 102 and the housing 104 communicate with the outside of the space SP is provided in a region different from the region where the attachment portion 104b is provided. The communicating hole 106 is formed by a through hole extending through the housing 104. Here, FIG. 4 is a view showing a state in which the outer lens 102 is detached from the headlight unit 10 shown in FIG. 3.

The ventilation mechanism 110 is a mechanism configured to ventilate the space SP between the outer lens 102 and the housing 104 through the communicating hole 106. Even in a state in which the outer lens 102 and the housing 104 are connected, water in air exists in the space SP because the space SP is not a completely sealed space (sealed structure). Hence, in this embodiment, the ventilation mechanism 110 communicating with the communicating hole 106 is provided on the outer surface (the surface on the opposite side of the outer lens 102) of the housing 104 to ventilate the space SP between the outer lens 102 and the housing 104, thereby enabling suppression of occurrence of condensation (fogging) in the space SP, for example, inside the outer lens 102.

Figure 5:
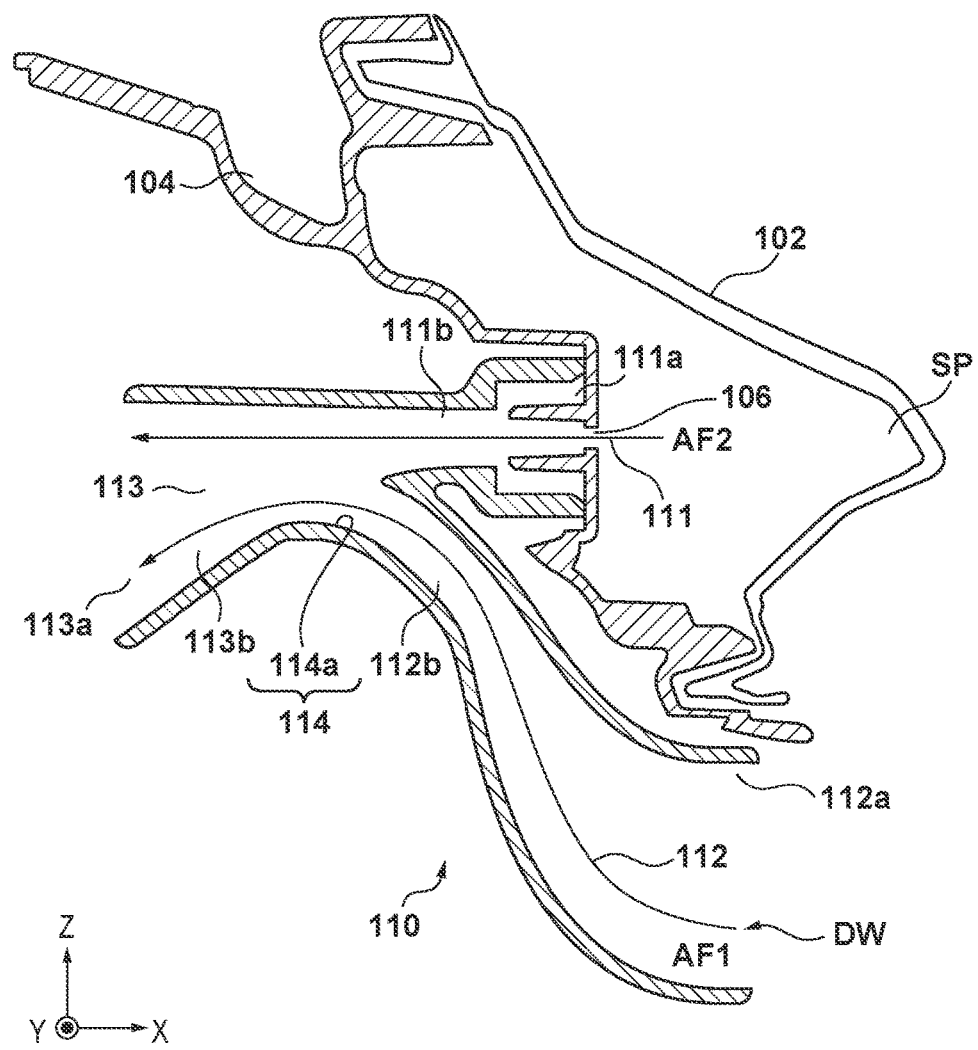
FIG. 5 is a sectional view of the outer lens, the housing, and the ventilation mechanism of the vehicle shown in FIG. 1 taken along an X-Z plane.
Figure 6:
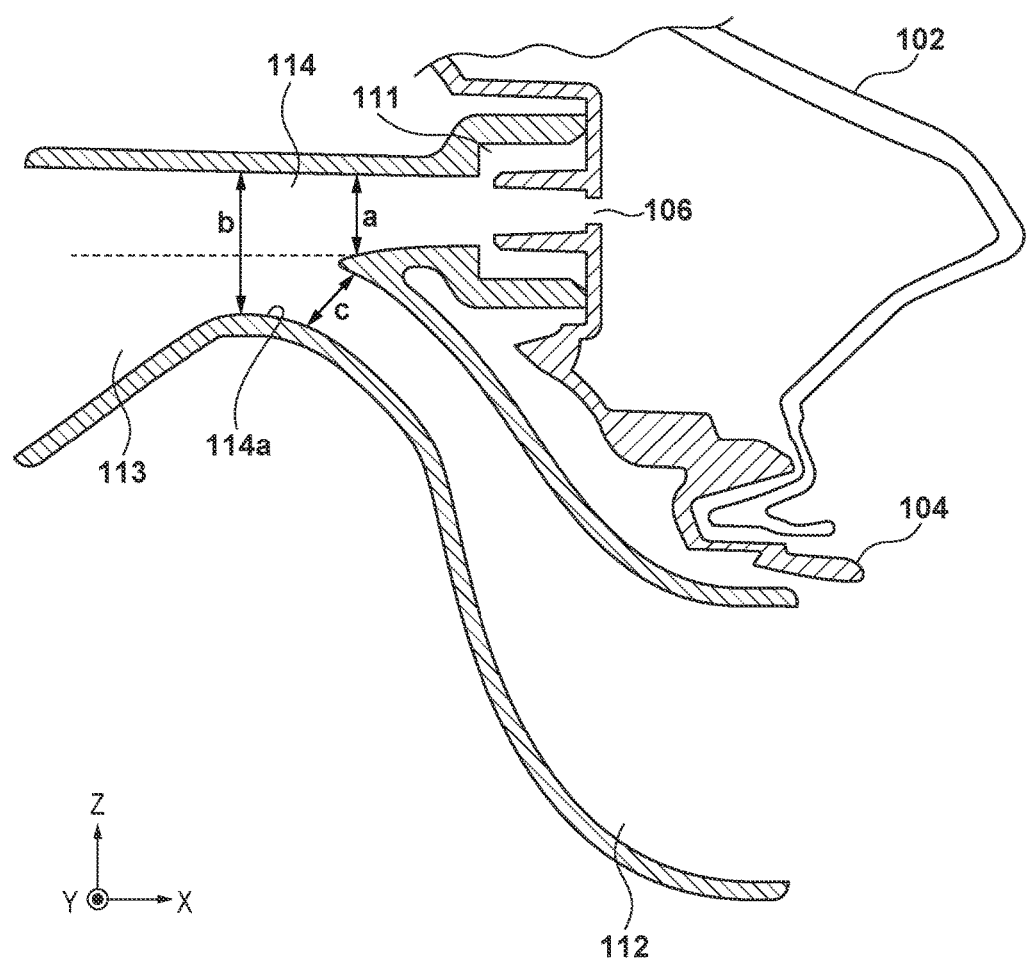
FIG. 6 is an enlarged sectional view of the ventilation mechanism shown in FIG. 5.

The arrangement of the ventilation mechanism 110 will be described with reference to FIGS. 5 and 6. FIG. 5 is a sectional view of the outer lens 102, the housing 104, and the ventilation mechanism 110 taken along an X-Z plane. FIG. 6 is an enlarged sectional view of the ventilation mechanism 110 shown in FIG. 5. The ventilation mechanism 110 includes a first passage 111, a second passage 112, a third passage 113, and a connecting passage 114.

The first passage 111, the second passage 112, the third passage 113, and the connecting passage 114 are tubular members each including a hollow portion to pass a fluid (gas). The first passage 111 includes a first opening 111a connected to the communicating hole 106 and communicating with the space SP between the outer lens 102 and the housing 104 at one end, and an opening 111b used to connect the connecting passage 114 at the other end. The second passage 112 includes a second opening 112a that opens to the front side of the vehicle 1 at one end, and an opening 112b used to connect the connecting passage 114 at the other end. The third passage 113 includes a third opening 113a that opens to the rear side of the vehicle 1 at one end, and an opening 113b used to connect the connecting passage 114 at the other end. The connecting passage 114 is a passage to which the other end (opening 111b) of the first passage 111, the other end (opening 112b) of the second passage 112, and the other end (opening 113b) of the third passage 113 are connected. The first passage 111, the second passage 112, the third passage 113, and the connecting passage 114 may be integrally formed. Alternatively, the first passage 111, the second passage 112, the third passage 113, and the connecting passage 114 may be formed by separate members and connected.

The function of the ventilation mechanism 110 including the first passage 111, the second passage 112 the third passage 113, and the connecting passage 114 that are configured in the above-described way will be described. When the vehicle 1 starts traveling, a traveling wind DW flows into the second passage 112 through the second opening 112a that opens to the front side of the vehicle 1. Since the traveling wind DW that has flowed into the second passage 112 passes to the third passage 113 through the connecting passage 114, an airflow AF1 directed from the second passage 112 (second opening 112a) to the third passage 113 (third opening 113a) through the connecting passage 114 is formed. At this time, since a negative pressure is generated on the periphery of the airflow AF1, the gas in the space SP between the outer lens 102 and the housing 104 is taken into the connecting passage 114 through the communicating hole 106 and the first passage 111. Since the gas in the space SP, which is taken into the connecting passage 114, passes to the third passage 113, an airflow AF2 directed from the space SP to the third passage 113 through the communicating hole 106 and the first passage 111 is formed. It is therefore possible to ventilate the space SP between the outer lens 102 and the housing 104.

In this way, the ventilation mechanism 110 positively discharges the gas in the space SP between the outer lens 102 and the housing 104 toward the third passage on the rear side using the traveling wind DW, thereby ventilating the space SP. Since water contained in the gas in the space SP between the outer lens 102 and the housing 104 is thus removed (discharged to the outside of the space SP), occurrence of condensation (fogging) in the space SP, for example, occurrence of condensation inside the outer lens 102 can be suppressed. Additionally, even if condensation occurs in the space SP, the condensation can positively be removed when the vehicle 1 travels.

In addition, as shown in FIG. 6, an inner diameter b of the connecting passage 114 is preferably larger than an inner diameter (the opening diameter of the opening 111b) a of the other end of the first passage 111 connected to the connecting passage 114. This makes it possible to reduce impediment of the airflow AF2 directed from the space SP between the outer lens 102 and the housing 104 to the third passage 113 through the communicating hole 106 and the first passage 111 by the connecting passage 114 and smoothly ventilate the space SP.

Furthermore, as shown in FIG. 6, the inner diameter b of the connecting passage 114 is preferably smaller than the sum of the inner diameter (the opening diameter of the opening 111b) a of the other end of the first passage 111 connected to the connecting passage 114 and an inner diameter (the opening diameter of the opening 112b) c of the other end of the second passage 112 connected to the connecting passage 114. This makes it possible to more reliably ventilate the space SP between the outer lens 102 and the housing 104 by the traveling wind DW (airflow AF1) flowing into the second passage 112.

Moreover, the inner diameter of the third passage 113 preferably increases from the front side of the vehicle 1 to the rear side. This makes it possible to reduce impediment of the airflows AF1 and AF2 joining in the connecting passage 114 on the third passage side and smoothly ventilate the space SP between the outer lens 102 and the housing 104.

Furthermore, as shown in FIG. 6, an inner wall 114a of the connecting passage 114 in a portion connected to the other end of the second passage 112 preferably curves to the inside of the connecting passage 114 (has a smoothly projecting shape). Since the traveling wind DW (gas) flowing from the second passage 112 into the connecting passage 114 thus flows along the inner wall 114a of the connecting passage 114 due to the Coanda effect, it is possible to prevent the airflows AF1 and AF2 from excessively interfering.

Figure 7:
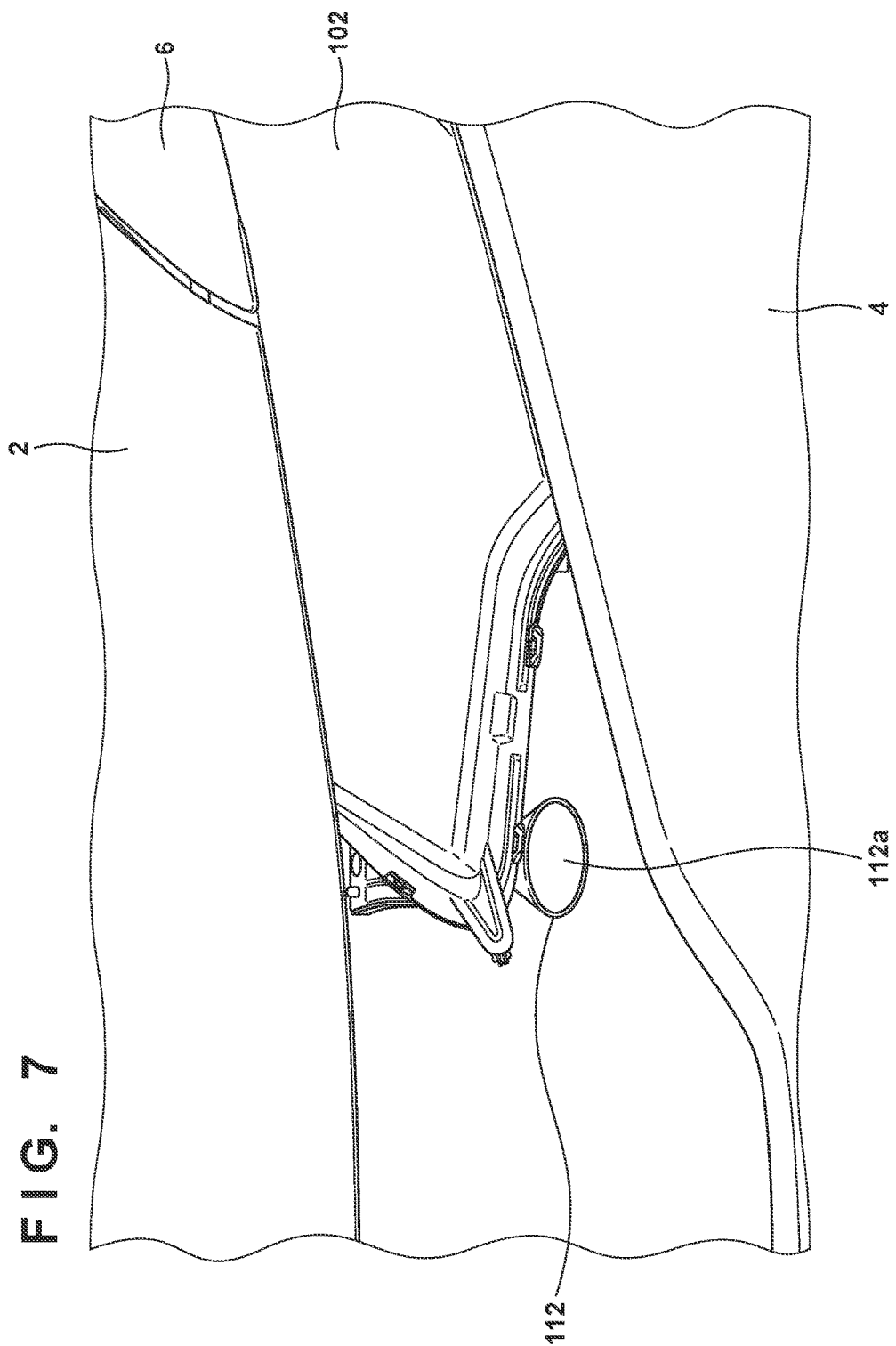
FIG. 7 is a view showing the front surface of the vehicle in a state in which a front grille is detached.
Figure 8:
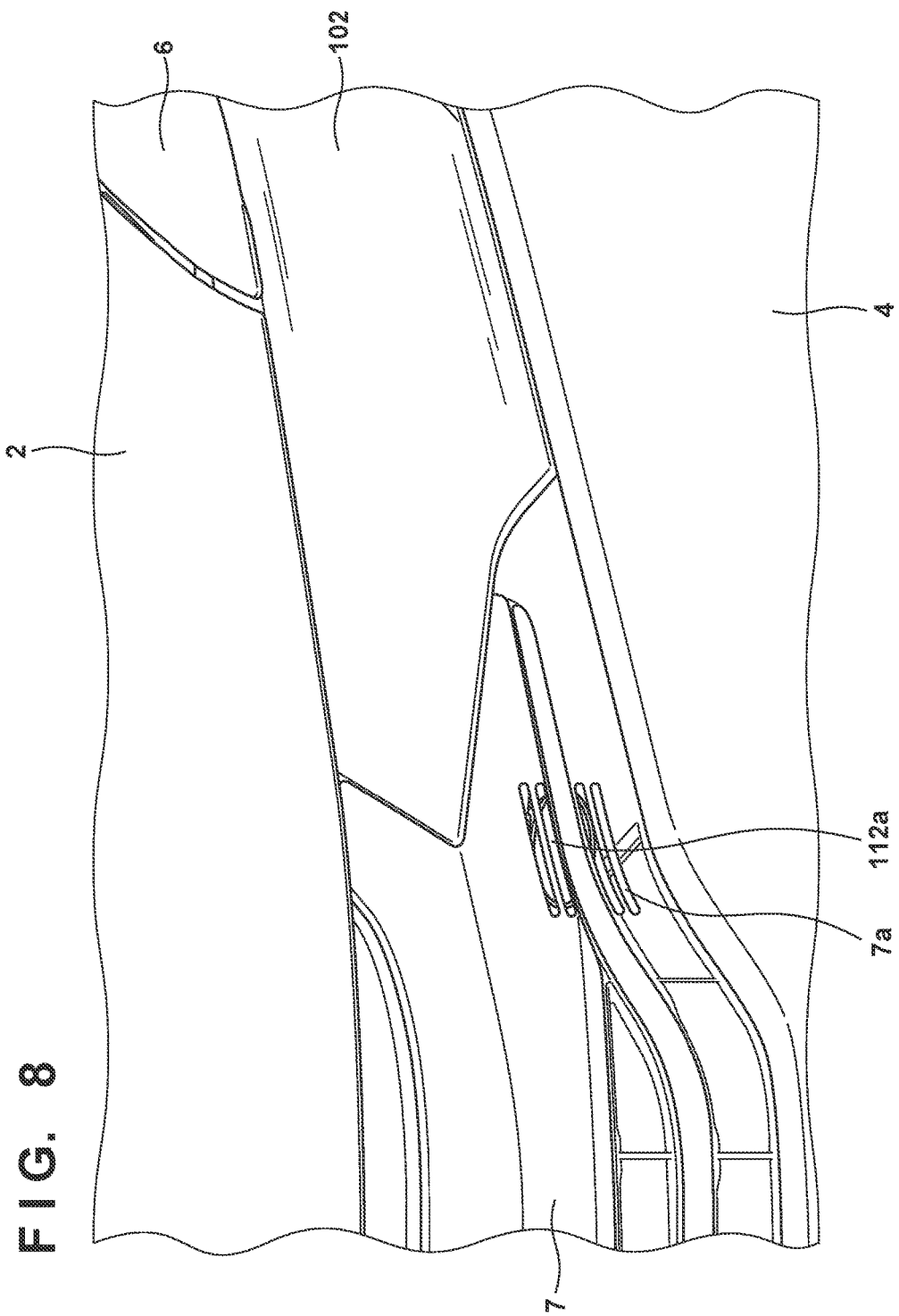
FIG. 8 is a view showing the front surface of the vehicle in a state in which the front grille is attached.

In addition, the second opening 112a of the second passage 112 opens to the front side of the vehicle 1, as described above. More specifically, as shown in FIG. 7, the second opening 112a preferably opens to a region adjacent to the outer lens 102. The region adjacent to the outer lens 102 is provided with the front grille 7 with an air hole 7a formed at a position corresponding to the second opening 112a, as shown in FIG. 8. When the second opening 112a of the second passage 112 opens toward the front grille 7, the traveling wind DW taken from the front grille 7 can be taken into the second opening 112a of the second passage 112. In addition, since the second opening 112a of the second passage 112 can be covered with the front grille 7, the design properties can be improved. Here, FIG. 7 is a view showing the front surface 1a of the vehicle 1 in a state in which the front grille 7 is detached, and FIG. 8 is a view showing the front surface 1a of the vehicle 1 in a state in which the front grille 7 is attached. Note that FIGS. 7 and 8 show only the neighborhood of the outer lens 102.

The preferred embodiment of the present invention has been described above. However, the present invention is not limited to this embodiment, and various changes and modifications can be made within the scope of the present invention. For example, in the embodiment, a case in which the present invention is applied to a headlight has been described as an example. However, the present invention can be applied to a turn lamp or a fog lamp as well, and can also be applied to a lamp (rear combination lamp) in the rear part of the vehicle by making a contrivance to the introduction hole of the traveling wind.

<Summary of Embodiment>

1. A light unit according to the above-described embodiment is a light unit (for example, 10) attached to a vehicle (for example, 1), the unit comprising:

an outer lens (for example, 102) configured to form a part of an outer surface of the vehicle;

a housing (for example, 104) connected to the outer lens and provided with a light source configured to illuminate an outside of the vehicle;

a communicating hole (for example, 106) provided in the housing and configured to make a space (for example, SP) between the outer lens and the housing communicate with an outside of the space; and a ventilation mechanism (for example, 110) configured to ventilate the space, wherein the ventilation mechanism includes:

a first passage (for example, 111) including, at one end, a first opening (for example, 111a) connected to the communicating hole and communicating with the space;

a second passage (for example, 112) including, at one end, a second opening (for example, 112a) that opens to a front side of the vehicle;

a third passage (for example, 113) including, at one end, a third opening (for example, 113a) that opens to a rear side of the vehicle; and a connecting passage (for example, 114) to which the other end of the first passage, the other end of the second passage, and the other end of the third passage are connected.

According to this embodiment, since a traveling wind flows into the second passage through the second opening, an airflow directed from the second passage to the third passage through the connecting passage is formed, and an airflow directed from the space between the outer lens and the housing to the third passage through the communicating hole and the first passage is formed, it is therefore possible to ventilate the space.

2. The light unit (for example, 10) according to the above-described embodiment, wherein an inner diameter (for example, b) of the connecting passage (for example, 114) is larger than an inner diameter (for example, a) of the other end of the first passage (for example, 111) connected to the connecting passage.

According to this embodiment, it possible to reduce impediment of the airflow directed from the space between the outer lens and the housing to the third passage through the communicating hole and the first passage by the connecting passage and smoothly ventilate the space.

3. The light unit (for example, 10) according to the above-described embodiment, wherein the inner diameter (for example, b) of the connecting passage (for example, 114) is smaller than a sum of the inner diameter (for example, a) of the other end of the first passage (for example, 111) connected to the connecting passage and an inner diameter (for example, c) of the other end of the second passage (for example, 112) connected to the connecting passage.

According to this embodiment, it is possible to more reliably ventilate the space between the outer lens and the housing by the traveling wind flowing into the second passage.

4. The light unit (for example, 10) according to the above-described embodiment, wherein an inner diameter of the third passage (for example, 113) increases from the front side of the vehicle (for example, 1) to the rear side.

According to this embodiment, it is possible to reduce impediment of the airflows joining in the connecting passage on the third passage side and smoothly ventilate the space between the outer lens and the housing.

5. The light unit (for example, 10) according to the above-described embodiment, wherein an inner wall (for example, 114a) of the connecting passage (for example, 114) in a portion connected to the other end of the second passage (for example, 112) curves to an inside of the connecting passage.

According to this embodiment, since the traveling wind flowing from the second passage into the connecting passage thus flows along the inner wall of the connecting passage due to the Coanda effect, it is possible to prevent the airflow from the first passage and the airflow from the second passage from excessively interfering.

6. The light unit (for example, 10) according to the above-described embodiment, wherein the second opening (for example, 112a) of the second passage (for example, 112) opens toward a front grille (for example, 7) provided to be adjacent to the outer lens (for example, 102).

According to this embodiment, it is possible to take the traveling wind taken from the front grille into the second opening of the second passage and improve the design properties.

7. A vehicle according to the above-described embodiment is a vehicle (for example, 1) including a light unit (for example, 10) attached to a front surface of the vehicle, wherein the light unit includes the above-described light unit.

According to this embodiment, it is possible to efficiently ventilate the space between the outer lens and the housing by the above-described light unit and suppress occurrence of condensation (fogging) in the space.

This application claims the benefit of Japanese Patent Application No. 2017-106806, filed May 30, 2017 which is hereby incorporated by reference herein in its entirety.

What is claimed is:

1. A light unit attached to a vehicle, the unit comprising:
    an outer lens configured to form a part of an outer surface of the vehicle;
    a housing connected to the outer lens and provided with a light source configured to illuminate an outside of the vehicle, the housing comprising a hole; and
    a ventilation mechanism configured to ventilate a space between the outer lens and the housing,
    wherein the ventilation mechanism includes:
    a first passage including, at one end, a first opening connected to the hole and communicating with the space;
    a second passage including, at one end, a second opening that opens to a front side of the vehicle;
    a third passage including, at one end, a third opening that opens to a rear side of the vehicle;
    a connecting passage to which the other end of the first passage, the other end of the second passage, and the other end of the third passage are connected; and
    an inner diameter of the connecting passage is larger than an inner diameter of the other end of the first passage connected to the connecting passage, and is smaller than a sum of the inner diameter of the other end of the first passage connected to the connecting passage and an inner diameter of the other end of the second passage connected to the connecting passage.

2. The unit according to claim 1, wherein an inner diameter of the third passage increases from the front side of the vehicle to the rear side.

3. The unit according to claim 1, wherein an inner wall of the connecting passage in a portion connected to the other end of the second passage curves to an inside of the connecting passage.

4. The unit according to claim 1, wherein the second opening of the second passage opens toward a front grille provided to be adjacent to the outer lens.

5. A vehicle including a light unit attached to the vehicle, wherein the light unit includes:
    an outer lens configured to form a part of an outer surface of the vehicle;
    a housing connected to the outer lens and provided with a light source configured to illuminate an outside of the vehicle, the housing comprising a hole; and
    a ventilation mechanism configured to ventilate the space, and
    the ventilation mechanism includes:
    a first passage including, at one end, a first opening connected to the hole and communicating with the space;
    a second passage including, at one end, a second opening that opens to a front side of the vehicle;
    a third passage including, at one end, a third opening that opens to a rear side of the vehicle;
    a connecting passage to which the other end of the first passage, the other end of the second passage, and the other end of the third passage are connected; and
    an inner diameter of the connecting passage is larger than an inner diameter of the other end of the first passage connected to the connecting passage, and is smaller than a sum of the inner diameter of the other end of the first passage connected to the connecting passage and an inner diameter of the other end of the second passage connected to the connecting passage.

* * * * *